May 15, 1934.  C. F. ALLISON  1,959,015
BAG CLOSING MACHINE
Filed July 31, 1930  10 Sheets-Sheet 1

Inventor
Charles F. Allison.

May 15, 1934.   C. F. ALLISON   1,959,015
BAG CLOSING MACHINE
Filed July 31, 1930   10 Sheets-Sheet 2

May 15, 1934.  C. F. ALLISON  1,959,015
BAG CLOSING MACHINE
Filed July 31, 1930   10 Sheets-Sheet 5

Inventor
Charles F. Allison.

May 15, 1934.　　　C. F. ALLISON　　　1,959,015

BAG CLOSING MACHINE

Filed July 31, 1930　　　10 Sheets-Sheet 7

Inventor

Charles F. Allison.

May 15, 1934.   C. F. ALLISON   1,959,015
BAG CLOSING MACHINE
Filed July 31, 1930   10 Sheets-Sheet 8

Inventor
Charles F. Allison.

May 15, 1934.  C. F. ALLISON  1,959,015
BAG CLOSING MACHINE
Filed July 31, 1930    10 Sheets-Sheet 9

Inventor
Charles F. Allison.

May 15, 1934. C. F. ALLISON 1,959,015
BAG CLOSING MACHINE
Filed July 31, 1930 10 Sheets-Sheet 10

Inventor
Charles F. Allison.

Patented May 15, 1934

1,959,015

UNITED STATES PATENT OFFICE 1,959,015

BAG CLOSING MACHINE

Charles F. Allison, Hegewisch, Ill., assignor to B. F. Gump Co., Chicago, Ill., a corporation of Illinois Application July 31, 1930, Serial No. 471,922

7 Claims. (Cl. 216—30)

This invention relates to a bag closing machine in which the empty neck of the bag is folded over upon the top of the bag and concerns itself primarily with means for moistening and pasting a piece of adhesive tape over the folded neck of the bag.

It is among the objects of this invention to provide a tape applying mechanism in which a limited amount of moisture is applied to the tape and in which the said tape is pasted over the top and ends or vertical parts of the bag in order to effectively seal the same.

The invention comprises the novel structure and combination of parts hereinafter described and more particularly pointed out and defined in the appended claims.

In the accompanying drawings which illustrate a preferred form of this invention and in which similar reference numerals refer to similar features in the different views.

Figure 1:
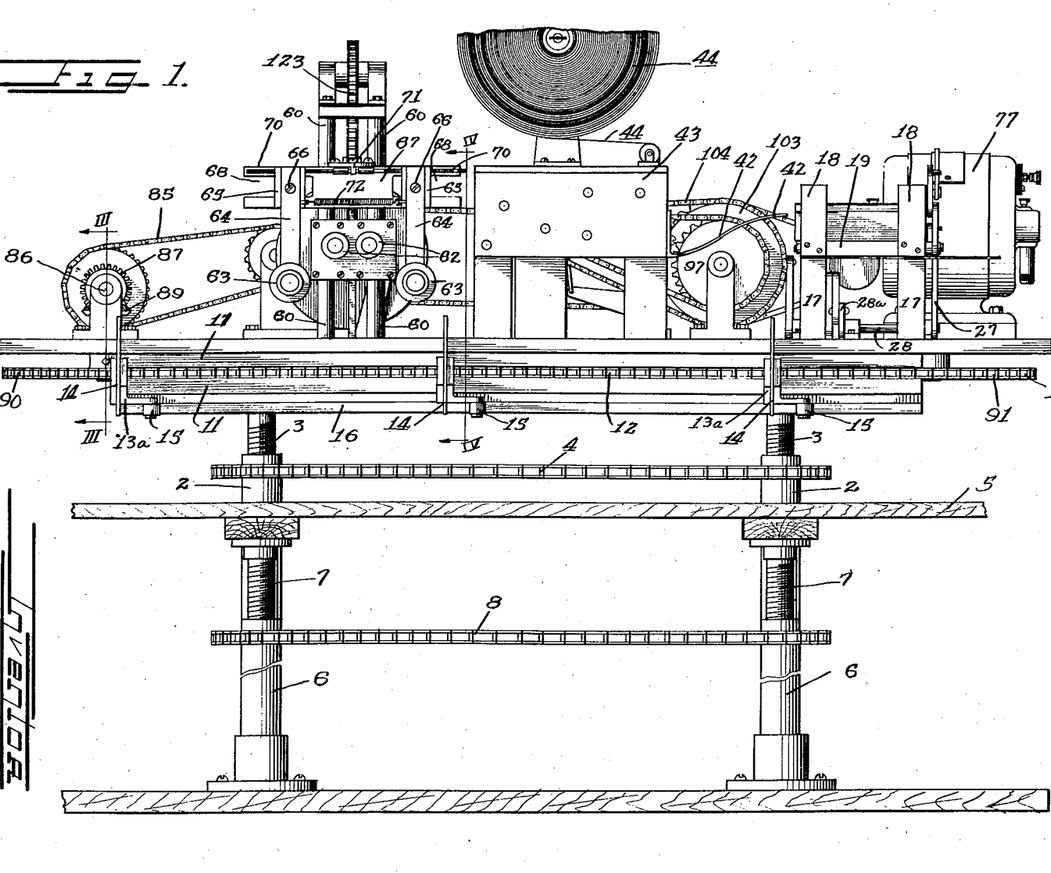
Figure 1 is a side elevational view of a bag closing machine involving this invention.
Figures 2, 3:
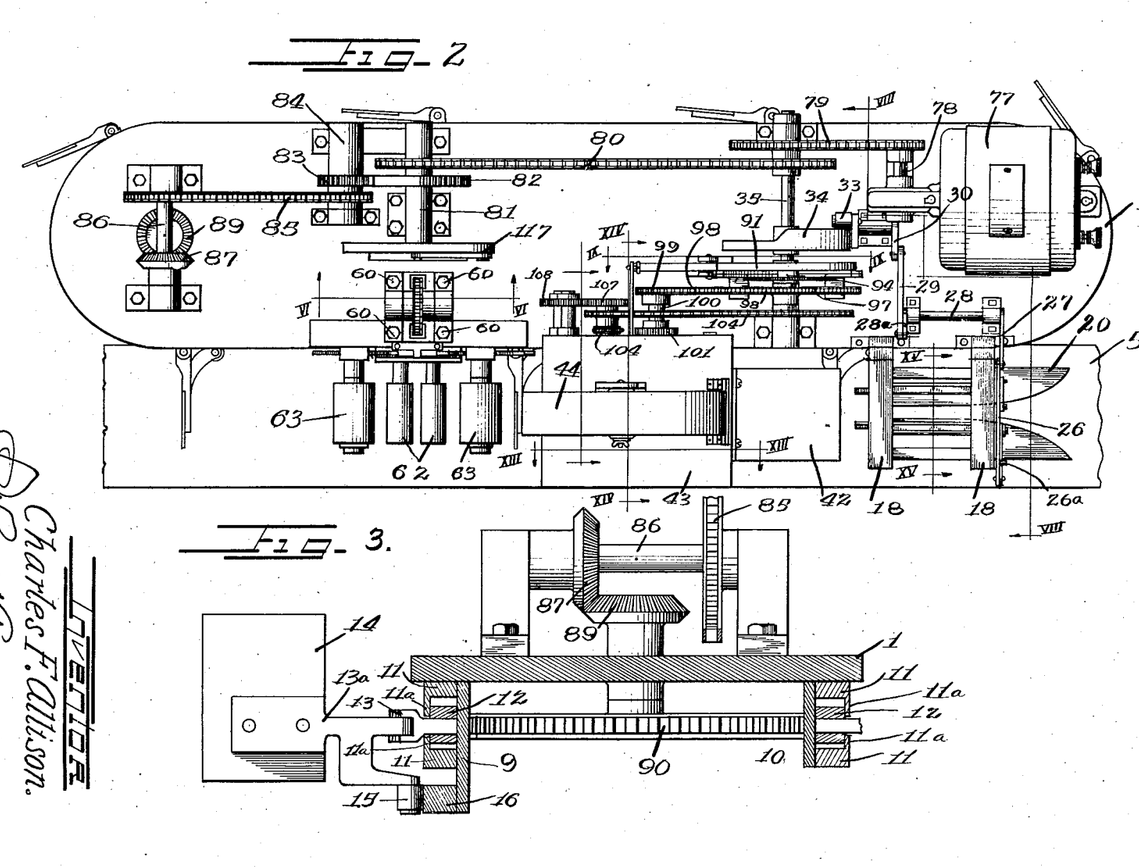
Figure 2 is a top plan view of such machine.
Figure 3 is an enlarged sectional view taken upon the line III—III of Figure 1 looking in the direction of the arrow.

As illustrative of this invention, there is shown in the drawings a bag closing machine embodying a bench or table 1 which is supported upon suitable adjustable legs consisting of rotatable sockets 2 and screws 3 therein. The rotatable sockets 2 are adapted to be actuated by a sprocket gearing 4 for raising and lowering the screws 3 for adjusting the height of the table top 1. Along one side of the machine, there is a platform 5 which forms a slide way for the bags as they are propelled along for the purpose of folding the tops thereof and applying the tape over the top and ends thereof as will later more fully appear. This platform is mounted upon suitable legs consisting of rotatable sockets 6 in which screws 7 are located. The rotatable sockets 6 may be connected by sprocket gearing 8 for rotating the same for raising or lowering the slide platform 5 for the bags. Depending from the front side of the table 1 there is a guide plate 9 (Fig. 3) and depending from the rear portion of the table 1 there is a depending plate 10 as shown more clearly in Figures 3 and 4. These depending plates carrying spaced blocks 11 which have approaching lips 11a. The spaced blocks 11 define a guide way for the conveyor chain, which travels in an oblong path beneath the table 1.

Figure 4:
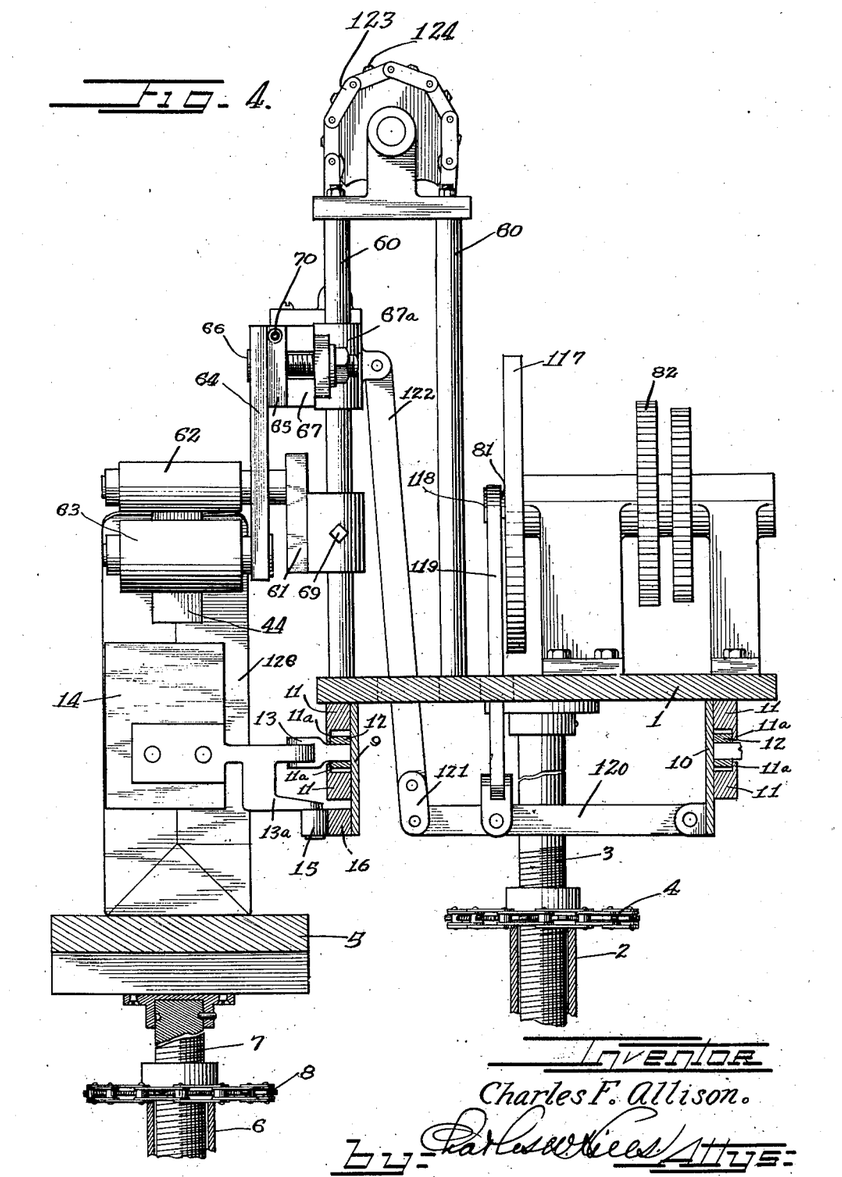
Figure 4 is an enlarged part sectional and part elevational view taken substantially upon the line IV—IV of Figure 1, looking in the direction of the arrows.

At suitable intervals the chain is provided with ears 13 to which castings 13a are secured and these castings 13a in turn carry bag propellers 14 which are located above the bag platform 5 as shown more clearly in Figure 4. The castings 13a are provided with rollers 15 which travel upon the track 16 secured to the guide plate 9 upon the front side of the machine.

Figures 8, 9:
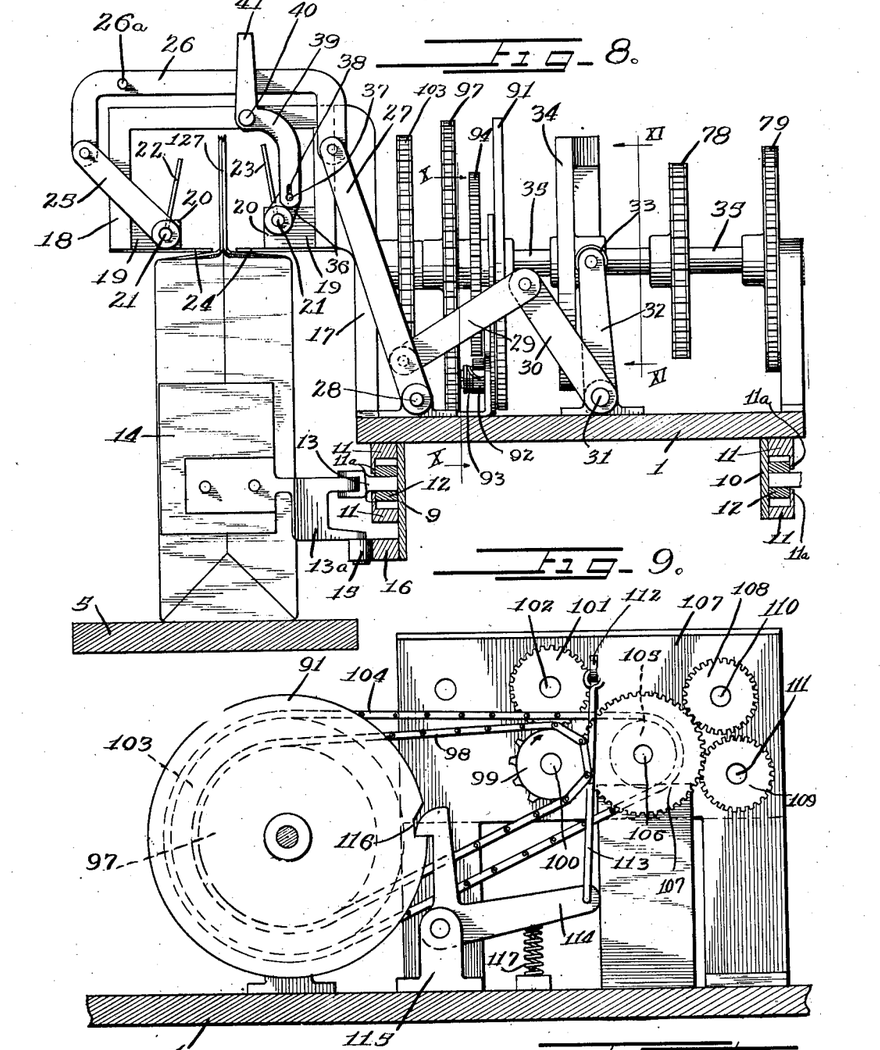
Figure 8 is an enlarged view taken upon the line VIII—VIII of Figure 2, looking in the direction of the arrows, showing parts in elevation and parts in section.
Figure 9 is an enlarged sectional view taken upon the line IX—IX of Figure 2 showing parts in elevation, looking in the direction of the arrows.
Figure 15:
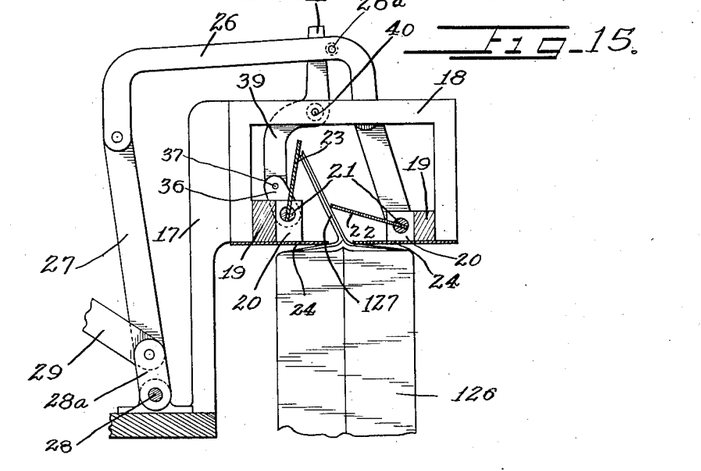
Figure 15 is a sectional view taken substantially upon the line XV—XV of Figure 2 showing parts in elevation, looking in the direction of the arrows.
Figure 16:
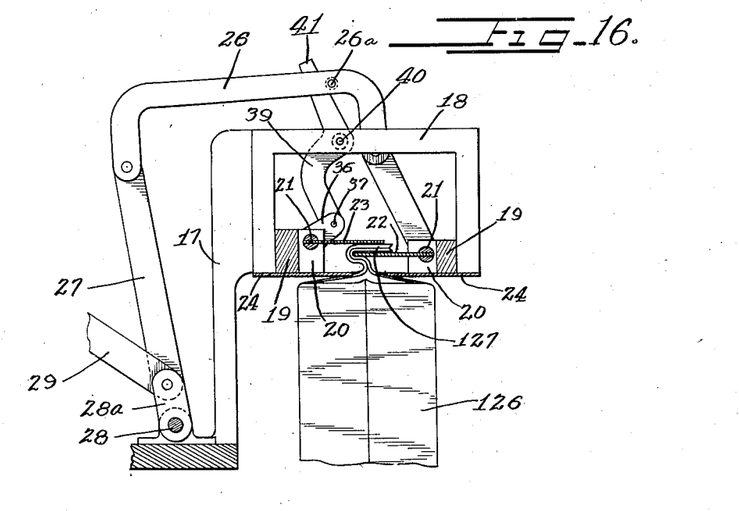
Figure 16 is the same view as Figure 15 but showing the parts in different position.

In referring to Figures 1, 8, 15 and 16, it will be noted that a pair of standards or supports 17 rise from the forward end of the bench 1 and support U-shaped frames 18. Suitable metal strips 19 are secured to the lower ends of the U-shaped members 18 and these members 19 have terminal ears 20 inwardly directed for supporting shafts 21 upon which the folding members 22 and 23 are respectively mounted. Suitable guide plates 24 are attached to the bottom of the U-shaped members 18 and the bearing strips 19 and closely approach each other at their inner ends to form a guide way through which the necks of the bags are adapted to pass as shown in Figures 8, 15 and 16.

The mechanism for operating the folders 22 and 23 will now be set forth. In referring especially to Figure 8, it will be noted that a crank 25 is rigidly connected to the shaft 21 of the folder 22 and this crank 25 is connected with a U-shaped link 26 which is connected at its opposite end with a link 27. The link 27 is secured upon a shaft 28 journalled upon the bench 1 and this shaft has a crank 28a to which one end of a link 29 is connected. The other end of the link 29 is connected to the end of a crank 30 which is secured to a shaft 31 which also rigidly carries a cam actuated crank arm 32 having a roller 33 thereon which is adapted to be actuated by a cam 34 which is mounted upon a shaft 35. The rotation of the shaft 35 will actuate the cam disc 34 and through the aforementioned crank and links will actuate the shaft 20 for turning down the folding blade 22.

The folding blade 23 which is secured upon the other shaft 21 is actuated by the following mechanism: a crank arm 36 is secured upon one end of this shaft 21 and is provided with a pin 37 which extends through a slot 38 in a lever 39 which is pivoted intermediate its ends to one of the U frames 18 as indicated at 40. This lever 39 has an arm 41 extending above the pivot 40 and in the path of movement of a stud 26a secured upon the U-shaped link 26 with the result that after the folding blade 22 has been actuated a predetermined extent, the stud 26a will strike the arm 21 and actuate the lever 39 for turning this shaft 21 for operating the folding member 23 as illustrated in Figures 15 and 16. It might be here mentioned that the bags are intermittently driven by the conveyor chain which comes to rest when the bag is being folded and when the tape is being applied as will alter more fully appear.

Figure 13:
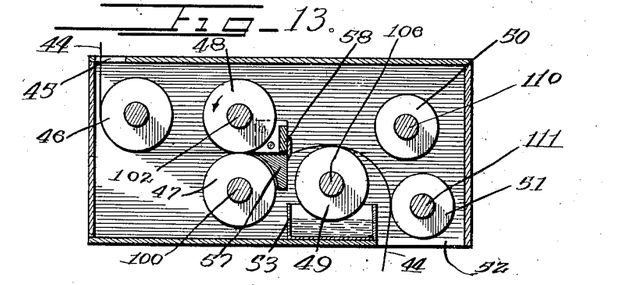
Figure 13 is an enlarged sectional view of the tape box taken substantially upon the line XIII—XIII of Figure 2, looking in the direction of the arrows.

At the proper time, the paper bag with its neck folded as shown in Figure 16 passes under a spring guide plate 42 (Fig. 1) and then under the tape box 43 which tend to maintain the folded relation of the neck portions of the bags. Upon the top of the tape box 43 there is a roll of tape 44 which is adapted for entering the tape box through a slot 45 (Fig. 13) at the right hand end of said box as viewed in F'gure 2. The tape then passes around a guide roll 46 within the tape box and between a pair of feed rolls 47 and 48 and then over a moistening roll 49. A pair of guide rolls 50 and 51 are journalled in the tape box for guiding the tape 44 through an opening 52 in the left hand end of the box as shown in Figure 13. The different rolls 46 to 51 are journalled in the tape box and the moistening roll 49 is journalled so as to contact the fluid in a trough 53 which is arranged in the bottom of the tape box. The trough 53 is provided with a spillway 54 for maintaining the fluid therein at a constant level. This spillway 54 (Fig. 14) is adapted for discharging its contents into a well 55 from which the fluid is adapted to be elevated by a rope conveyor 56 which again discharges the same into the trough 53. It should be understood that this particular arrangement insures the moistening roll against carrying an oversupply of fluid to the adhesive tape and interfering with the pasting or gluing operation. It is exceedingly important that only a limited amount of moisture be supplied to the adhesive tape. Of course, it will be realized that the moistening apparatus herein illustrated may be modified in various respects and may assume various different forms providing the fluid in the moistening trough is maintained at substantially a constant level in order to limit the amount of moisture that is imparted to the adhesive tape and it is contemplated that any other means may be employed for limiting the moisture that should be carried by the moistening roll 49.

Figure 14:
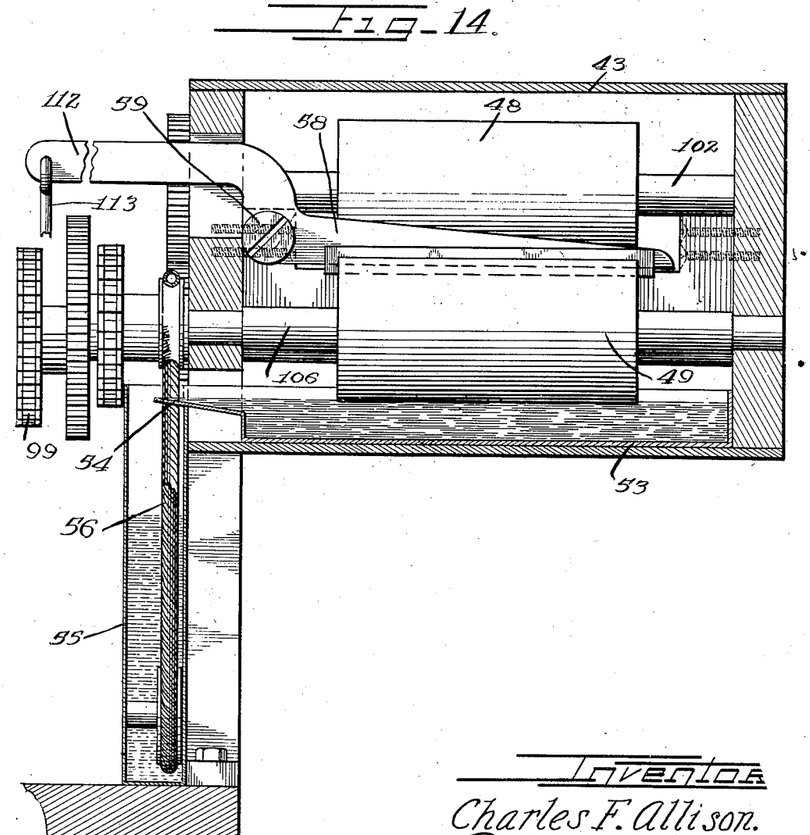
Figure 14 is also an enlarged view of the tape box taken substantially on line XIV—XIV of Figure 2 and at right angles to the view shown in Figure 13, and looking in the direction of the arrows.

As the tape 44 passes between the two feed rolls 47 and 48 it passes over a shearing platform 57 with which a swinging shear 58 is adapted for co-operating for severing a piece of tape. This shear 58 which is shown in Figure 14 as in the form of a lever is pivoted at 59 to a bearing on the tape box. The parts are so timed that the feed rolls are set in motion for delivering a piece of tape 44 into the path of the traveling bag in such manner that it will overlap the front portion thereof and as the bag advances it will travel under the tape which will be severed so that it will overhang the opposite end of the bag when the same emerges from under the tape box. In this position the tape will be in proper position for pasting or gluing the same to the top and the ends of the bag and suitable mechanism has been provided for so pasting the tape which will now be set forth.

Figure 5:
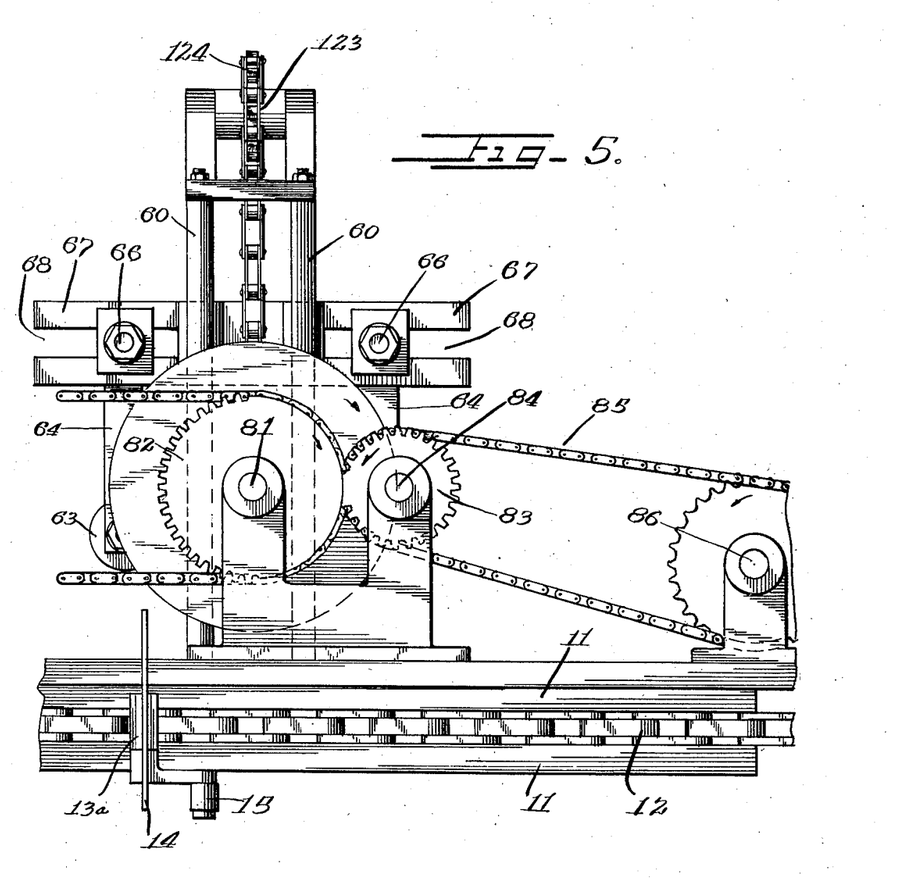
Figure 5 is an enlarged fragmentary side elevational view taken from the rear side of the view shown in Figure 1.
Figure 7:
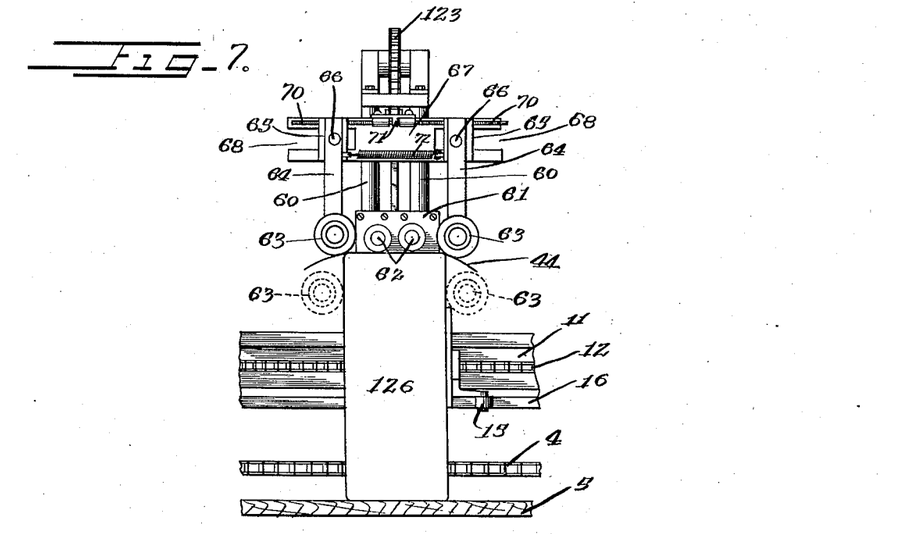
Figure 7 is an enlarged fragmentary side elevational view illustrating the manner of sealing an adhesive strip over the top of the bag.

The mechanism illustrated for applying the tape over the folded portion of the bag and upon the vertical parts of the body thereof, consists broadly of means for compressing the tape upon the top of the bag and means for pressing the tape against the vertical parts thereof, and preferably two ends of the bag. In the drawings, especially Figures 1, 2, 4 and 7, a suitable mechanism has been illustrated for accomplishing this purpose. In referring to these figures, it will be noted that two pair of rod-like standards 60 extend upwardly from the bench 1. An adjustable support 61 is mounted upon the front pair of rods 60 and this support carries a pair of rollers 62. As the folded bag is carried along by the conveyor it is adapted to pass under the rollers 62 which presses the adhesive tape carried by the bag over the top thereof as the bag momentarily pauses in its travel. At about the same time a pair of rollers 63 are caused to descend for pressing the adhesive tape against the vertical parts of the bag and preferably the ends thereof as shown in Figure 7. The rollers 63 are mounted upon a pair of swingable arms 64 which are pivoted to laterally adjustable bearing blocks 65 as indicated at 66. The bearing blocks 65 are mounted upon a reciprocating support 67 which is provided with suitable cylindrical bearings 67a (Figure 4) for slidingly engaging the rods 60. This support 67 has slotted or bifurcated ends 68 through which the pivot screws 66 extend as shown more clearly in Figure 5. It might be here mentioned that the support 61 for the roller 63 is secured by set screws 69 to the standard 60 whereby the same may be raised or lowered according to the height of the bag that is being closed. An adjustable screw 70 extends through each bearing block 65 and engages an abutment 71 upon the support 67 with the result that the bearing blocks may be laterally adjusted upon the support 67 by the manipulation of the screws in order to accommodate the rollers to bags of different dimensions. The two arms 64 are yieldingly restrained from separation by a coil spring 72 which tends to draw the two arms together with the result that as these arms descend they are yieldingly pressed against the ends of the bag as shown in dotted line in Figure 7.

Figure 17:
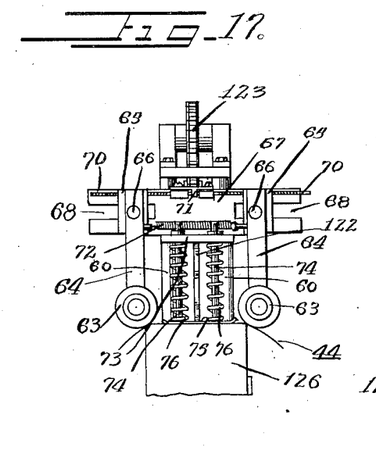
Figures 17, 18 and 19, are fragmentary elevational views illustrating a slightly modified form of tape applying mechanism.
Figure 18:
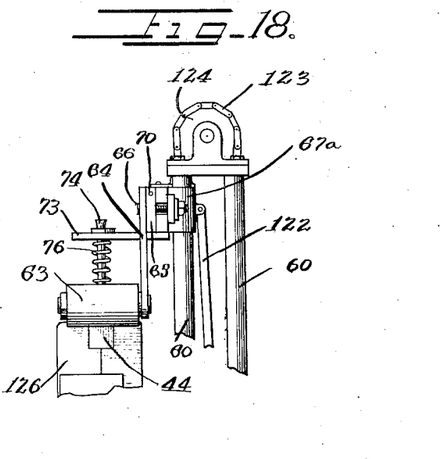
Figure 19:
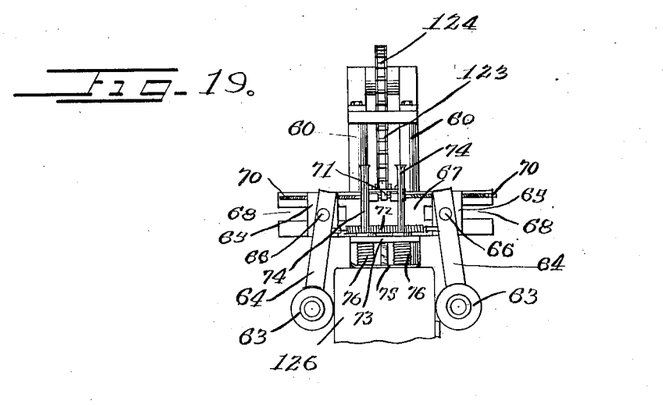

In Figures 17, 18 and 19 a modified form of mechanism has been shown for applying the tape to the folded neck of the bag and in referring to these figures it will be noted that the reciprocating support 67 which carries the rollers 63 has a projecting ledge support 73 which carries a pair of slidable rods 74 to which a flat pressure plate 75 is attached for pressing the tape upon the top of the bags. Suitable coil springs 76 surround the rods 74 between the ledge support 73 and the presser plate 75.

It should be noted that in this modified structure the plate 75 which is substituted for the aforementioned rollers 62 reciprocates with the support or carriage 67 and that when the plate 75 is arrested upon the top of the bag the rods 74 slide through the ledge support 73 while the rollers 63 descend relative to the plate 75. With this exception the modified structure shown in Figures 17, 18 and 19 is similar to that already described and requires no further explanation.

The mechanism for operating the different parts of the machine heretofore described will now be set forth. In referring to Figure 2, it will be noted that a motor 77 is supported upon the bench 1 and is geared to a shaft 78 which in turn is geared by means of sprocket gearing 79 to the aforementioned shaft 35 that operates the cam 34 for actuating the folders as previously set forth. The shaft 35 is geared by means of sprocket gearing 80 to a shaft 81 which is suitably journalled upon the bench 1 and which carries a mutilated gear 82 which meshes with a gear 83 secured upon another shaft 84 journalled upon the bench 1. The shaft 84 is geared by means of sprocket gearing to a shaft 86 journalled upon the bench 1 and carrying a beveled pinion 87 which meshes with a bevel pinion 89 which has a shaft extending thru the bench 1 and carries the head sprocket wheel 90 (Fig. 3) for operating the propelling conveyor 12 for the bags. It will, of course, be understood that a similar sprocket gear 90 is journalled at the other end of the bench 1. It might be here mentioned that the mutilated gear 82 is so arranged that the mutilated portion thereof will be rotated opposite the gear 83 so as not to rotate the same whenever a pause is desired in the operation of the endless propelling conveyor 12.

Figure 10:
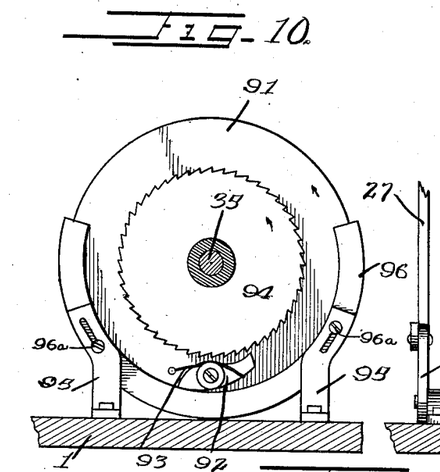
Figure 10 is an enlarged sectional view taken upon the line X—X of Figure 8 looking in the direction of the arrow and showing parts in elevation.
Figure 11:
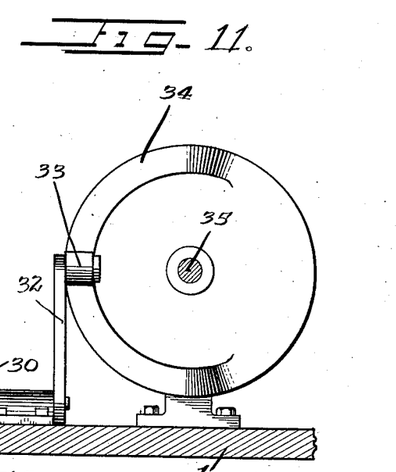
Figure 11 is a view taken upon the line XI—XI of Figure 8, showing parts in section and parts in elevation, looking in the direction of the arrows.
Figure 12:
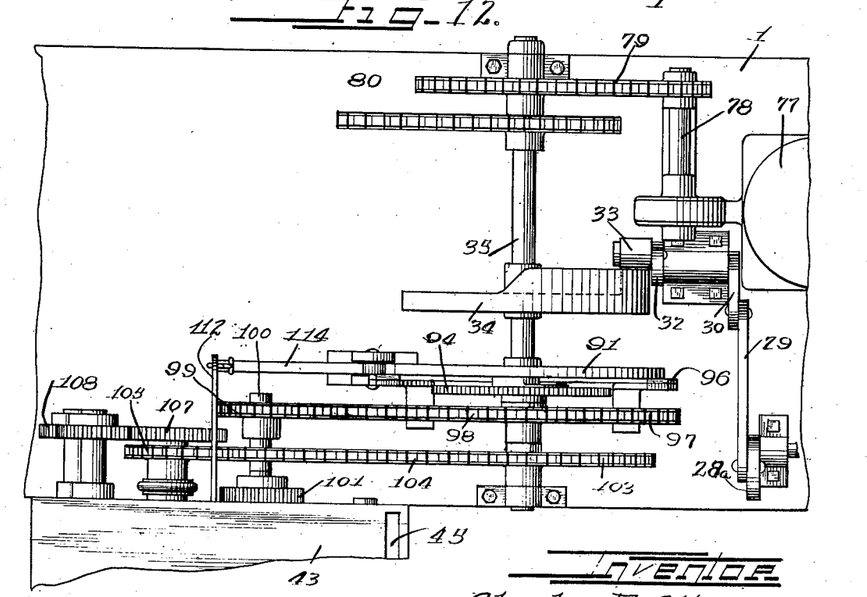
Figure 12 is an enlarged fragmentary top plan view illustrating parts of the operating mechanism of the machine.

The tape feeding roll, the shears, and the reciprocating tape applying mechanism are operated from the aforementioned shaft 35 in a manner that will now be explained. In referring to Figures 8, 9, 10 and 12, it will be noted that a disc 91 is rigidly secured upon the shaft 35 and this disc 91 carries a pawl 92. The pawl 92 is normally urged toward a ratchet wheel 94 by means of a spring 93. The pawl 92 is, however, held out of engagement with the ratchet wheel 94 for a predetermined rotary movement. In referring to Figure 10, it will be noted that a pair of uprights 95 extend from the bench 1 and support arcuate pawl guards 96 by means of slots and pins connections 96a by means of which the guards 96 may be adjusted in a circumferential direction. The tail of the pawl 92 is adapted to engage the guard 96 for holding the pawl out of engagement with the ratchet 94. However, as soon as the tail of the pawl passes beyond the guard 96 the spring 93 will force the pawl into engagement with the ratchet wheel 94 and effect an operative driving relation between the disc 91 and the ratchet 94. The ratchet 94 is loosely mounted upon shaft 35, and a sprocket gear 97 integral with the hub of the ratchet 94 for concurrent rotation therewith is loosely mounted upon a shaft 35 with the ratchet wheel 94. The sprocket gear 97 is driven when the pawl 92 engages the ratchet 94 and in turn drives a sprocket chain 98 which is trained over a sprocket wheel 99 rigidly secured upon the lower feed roll shaft 100. The shaft 100 is geared to a gear 101 which is secured on the shaft 102 of the upper feed roll for the adhesive tape. The arrangement is such that a piece of tape will be fed into the path of the bag at the proper time. In other words, the tape is fed forward and moistened while the bag is advancing so that no appreciable time elapses before the bag encounters the tape and the same is applied thereto. Consequently, the moistened glue on the tape will not be unduly exposed and will not have time to dry, a feature which is of the utmost importance in taping a bag.

Upon the near end of the shaft 35 there is secured a sprocket gear 103 which drives a sprocket chain 104 which is trained over a sprocket wheel 105 secured upon the shaft 106 of the tape moistening roll 49. A gear 107 (Figure 9) upon the shaft 106 drives the gears 108 and 109 respectively secured upon the shaft 110 and 111 which carry the two tape guide rolls 50 and 51. It will be noted that the moistening roll 49 and the guide rolls 50 and 52 rotate continuously, while the tape feed rolls 47 and 48 rotate only during that period in which the pawl 92 is inter-engaged with the ratchet 94. With reference to Fig. 9, it will be noted that the sprocket gears 99 and 105 are substantially of the same diameter, while the sprocket wheels 97 that drives sprocket gear 79 is slightly smaller than the sprocket gear 103 that drives the sprocket gear 105. Consequently the moistening roll 49 that engages the gummed side of the tape rotates slightly faster than the tape feeding rolls. This difference in speed prevents globules of fluid forming upon the gummed side of the tape and assures an even amount of moisture.

When a piece of tape has been fed into the path of the approaching bag, it is sheared by the shearing blade 58 which has an arm 112 extending through the tape box. This arm 112 is connected with a link 113 (Figure 9). The lower end of the link 113 is connected to a holding dog 114 which is in the form of a bell crank lever pivoted at its apex to a bracket 115 upon the bench 1. This dog is adapted to engage a notch 116 in the disc 91 (Figure 9). This notch has a straight face which is adapted to cooperate with the dog 114 to prevent counter-clockwise rotation of the disc as viewed in Figure 9. The upper end of this notch 116 slopes upwardly so that clockwise rotation of the disc 91 will force the dog out of said notch and elevate the shears while the dog is riding upon the periphery of the disc 91, the link 113 of the shears will be pulled downwardly and hold the shears in elevated position so that a piece of tape may be fed under the shears. After the disc 91 has completed a revolution the hook on the dog 114 will be forced into the notch 116 through the instrumentality of a compression spring 117 which is positioned between one arm of the dog and the bench 1. As soon as the dog 114 enters the notch 116, the link 113 will be elevated and allow the shears to drop for severing the tape which has been fed forward and which is of a proper length for taping the top and ends of the bag.

Figure 6:
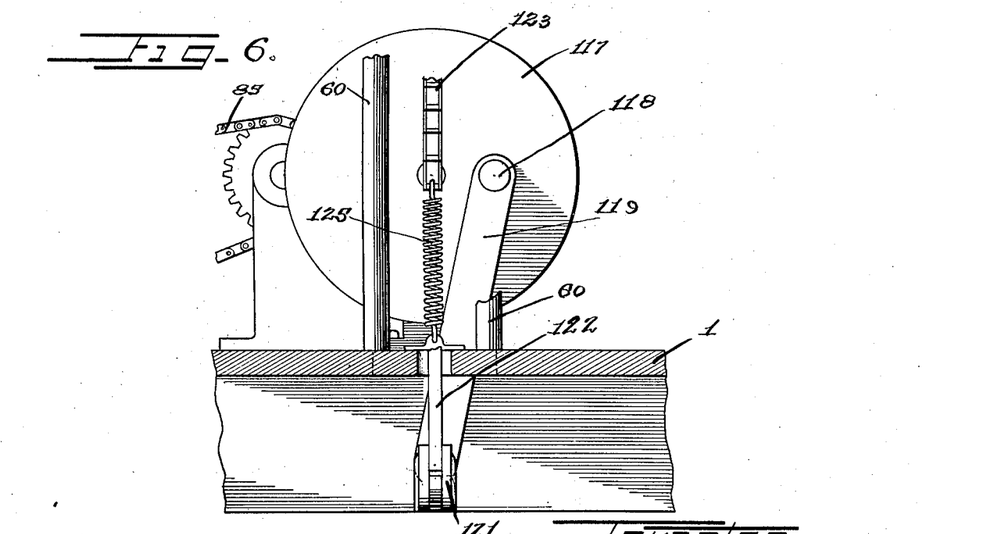
Figure 6 is an enlarged part sectional and part elevational view taken substantially upon the line VI—VI of Figure 2, looking in the direction of the arrows.

The mechanism for reciprocating the tape applying mechanism is best shown in Figure 4 and in referring to this figure, it will be noted that a crank disc 117 is secured upon the end of the shaft 81 and is equipped with a wrist pin 118 to which a link 119 is connected. The lower end of the link 119 is connected intermediate the end of a lever 120 which is pivoted at one end to the guide plate 10. To the other end of the link 120, there is connected a short link 121 to which a pitman 122 is pivoted. The upper end of the pitman 122 is connected to the reciprocating mechanism that presses the tape on the bag. In the form of the invention shown in Figure 4, the rolls 63 which attach the tape on the ends of the bag are only reciprocated while in the modified form shown in Figures 17 to 19 both the pressure plates 75 and the rolls 63 reciprocate. Both forms of the invention show a sprocket chain 123 connected thereto and trained over a sprocket 124 which is suitably journalled upon the top of the posts 60. This sprocket chain depends to a point adjacent the bench top 1 as shown in Figure 6 to which it is anchored by means of a coiled spring 125. This spring 125 will assist in elevating the reciprocating mechanism during the operation of the machine.

In the operation of the machine, a paper bag 126 is conveyed upon the platform 5 for engagement by a propeller 14 of the conveyor chain 12 which conveys the bag along the platform 5 with its neck 127 between the guide plates 24 into position beneath the folding members 22 and 23 at which point the conveyor comes to a pause due to the mutilated gear 82. The shaft 35, however, continues to rotate with the result that the cam 34 will actuate the folding members in succession for folding the neck of the bag as shown in Figure 16. As soon as this operation is completed the conveyor will again pick up the bag and slide it along the bag platform 5 with the folded neck engaging under the spring plate 42 and then under the tape box 43 which maintains the folded relation of the neck of the bag. By the time that the bag reaches the tape box, a suitable strip of tape has been fed down for engaging the front end of the bag as it passes under the box. As the bag advances the tape will be fed over the top of the box and such a length will be sheared off that it will descend over the rear end of the bag when operated upon by the tape applying rollers. This tape is properly moistened by the moistening roller 49 which just dips into the fluid which is maintained at a substantially constant level so that a surplus of water or liquid will not be supplied to the tape. This regulation of the amount of moisture is exceedingly important for the reason that if the adhesive tape is saturated with water, it cannot be securely pasted to the bag. The bag with the tape in proper position will next advance under the tape applying mechanism which will press the tape to the top of the bag and upon the sides of the bag as previously explained. It will, of course, be understood that the conveyor comes to rest when the bag is under the tape applying mechanism. In the first form of the tape applying mechanism the bag will pass under the rolls 62 and the rolls 63 will then descend and due to the spring 72 which spans the arms of these rolls the tape will be yieldingly pressed against the ends of the bag. However, in the form of the invention shown in Figures 17, 18 and 19 which is the preferred form, the reciprocating mechanism comprises both a means for pressing the tape on the top of the bag and also against the ends of the bag and these two means have relative movement. As the reciprocating mechanism is forced downwardly by the aforementioned link 122, the flat plate 175 will firmly press against the top of the bag and securely glue the tape 44 over the folded portion of the bag. Thereafter the springs 76 will be compressed as shown in Figure 19 and the rollers 63 will descend and roll down the ends of the bag and press or glue the adhesive tape 44 against the ends of the bag. As soon as the tape is properly glued to the bag, the reciprocating mechanism will be elevated so that the bag may move onwardly.

From the foregoing it will be appreciated that a novel bag closing mechanism has been invented which securely folds the neck of the bag over the center thereof and then applies a piece of adhesive tape over the top and ends of the bag to firmly close and seal the same. It will be appreciated a great deal of time and labor may be saved in closing paper bags where large numbers are daily closed for shipping to the trade.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a bag closing machine, a platform, a conveyor for propelling bags along said platform, folding mechanism, tape feeding mechanism, driving mechanism for operating said conveyor and momentarily arresting the same at said folding mechanism, means connecting said tape feeding mechanism with said driving mechanism after the operation of said folding mechanism and means for securing said tape to the top of the bag.

2. In a bag closing machine, a bag platform, a conveyor for propelling bags along said platform, folding mechanism for folding the necks of the bags, driving mechanism for said conveyor having provision for arresting said bag at the folding mechanism, tape feeding mechanism and means for setting said tape feeding mechanism in motion after said conveyor has moved a predetermined extent and means for applying the tape to the folded top of the bag.

3. In a bag closing machine, a platform, a conveyor for propelling bags along said platform, mechanism for folding the neck of said bag, driving mechanism for operating said conveyor and arresting the same momentarily at said folding mechanism, a tape box located over said platform, tape feeding mechanism set in motion after said bag has advanced a predetermined extent for feeding a piece of tape thru the bottom of said box, said bag passing under and in contact with said box and means for applying the tape over the top of said bag.

4. In a bag closing machine, a horizontal runway, a conveyor for moving a bag along said runway, means for folding the neck of the bag, tape feeding rolls, driving mechanism for operating said conveyor, said driving mechanism arresting said conveyor during the operation of said folding means, driving mechanism for said tape feeding rolls set in motion after said folding operation, means for applying a substantially constant quantity of moisture upon said tape, means for shearing said tape and means for applying the same to the folded portion of said bag.

5. In a bag closing machine, a horizontal runway, a conveyor for propelling bags along said runway, mechanism for folding the neck of the bag, driving mechanism for operating said conveyor and arresting the same for the folding operation, tape feeding and tape shearing mechanism, and means controlled by said driving mechanism for setting said tape feeding and tape shearing mechanism in operation after said folding operation.

6. In a bag closing machine having a folding station and a tape applying station, a tape box between said stations, a horizontal bag runway, a conveyor for propelling bags to said folding station, driving mechanism for operating said conveyor, tape feeding mechanism in said box, a driving connection between said tape feeding mechanism and said driving mechanism set in motion after said bag has been advanced a predetermined distance on said runway, said conveyor having a dwell at said folding station and acting to convey the folded bag under said box and to said tape applying station after the neck thereof has been folded.

7. In a bag closing machine, a horizontal bag runway having a bag folding station and a tape applying station, a conveyor for propelling bags along said runway, mechanism for operating said conveyor and arresting the same at said folding station and at said tape applying station, tape feeding rolls, mechanism for operating said tape feeding rolls set in motion after said conveyor has advanced the bag a predetermined extent upon said runway, means for folding the neck of said bag at said folding station and means for applying the tape at said tape applying station.

CHARLES F. ALLISON.